United States Patent
Ramannavar et al.

(10) Patent No.: US 7,577,712 B1
(45) Date of Patent: Aug. 18, 2009

(54) EFFICIENT EVENT COMPLETION IN UDAPL

(75) Inventors: Nitin R. Ramannavar, Lubbock, TX (US); Neelakanth M. Nadgir, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 531 days.

(21) Appl. No.: 11/395,745

(22) Filed: Mar. 31, 2006

(51) Int. Cl.
 *G06F 15/16* (2006.01)
(52) U.S. Cl. ...................................... 709/207; 711/101
(58) Field of Classification Search ................. 709/206, 709/207; 711/111, 1, 100, 101, 108, 118, 711/121
 See application file for complete search history.

(56) References Cited

U.S. PATENT DOCUMENTS

| 7,065,556 B1 * | 6/2006 | Hickey et al. | 709/217 |
| 2002/0026502 A1 * | 2/2002 | Phillips et al. | 709/219 |
| 2005/0289557 A1 * | 12/2005 | Supalov | 719/317 |

OTHER PUBLICATIONS

Dat Collaborative, "uDAPL: User Direct Access Programming Library," Version:1.2, Dated Sep. 15, 2004, pp. 1-350.

* cited by examiner

*Primary Examiner*—Moustafa M Meky
*Assistant Examiner*—Randy Scott
(74) *Attorney, Agent, or Firm*—Osha • Liang LLP

(57) ABSTRACT

A technique in accordance with one embodiment of the invention uses an adaptive algorithm to obtain UDAPL event messages. According to one aspect, a process repetitively performs the following steps as long as the process expects to receive at least one event message. By polling the event message queue at least once, the process determines whether the queue is empty. If the queue is empty, then the process blocks until specified criteria have been satisfied. Alternatively, if the queue is not empty, the process reads an event message from the queue. After the process has either read an event message from the event message queue or finished blocking, the foregoing steps are repeated if the process still expects to receive at least one more event message. According to one aspect, when the process blocks, the process blocks only until a specified number of event messages have arrived in the queue.

21 Claims, 2 Drawing Sheets

EFFICIENT EVENT COMPLETION IN UDAPL

BACKGROUND

Remote Direct Memory Access ("RDMA") is a communications technique that allows data to be transmitted from the memory of one computer to the memory of another, remote computer without the data passing through either computer's central processing unit ("CPU") and without calling an operating system kernel. RDMA was developed largely in response to increasing demands for network speed. Generally speaking, data can be transferred faster when the data does not have to pass through a CPU.

The InfiniBand™ computing architecture, for example, enables RDMA. InfiniBand™ has gradually been replacing the previously standard Peripheral Component Interconnect ("PCI") bus architecture in certain servers and personal computers. While the PCI architecture sends data in parallel, the InfiniBand™ architecture sends data in serial, but concurrently carries multiple channels of data in a multiplexed signal.

In order to allow programmers to code their programs in such a way that their programs can reap the benefits of RDMA, industry groups have collaborated and produced the User Direct Access Programming Library ("UDAPL"). UDAPL is an Application Programming Interface (API) that defines methods that a program can invoke in order to perform RDMA operations. For example, UDAPL defines a method that, when invoked, causes a computer to read from a remote memory region. For another example, UDAPL defines a method that, when invoked, causes a computer to write to a remote memory region.

UDAPL operations are asynchronous. Much like the way a person might deposit a letter into a mailbox for delivery and then go on with life without waiting for a response to that letter, a program that invokes a UDAPL method may go on performing other operations without waiting for any acknowledgement that the operations that should have been performed by that method actually were performed. However, because programs often need some assurance that specified operations actually were performed prior to performing other operations, UDAPL implements an event system.

Under the event system, events are automatically generated in response to the completion of UDAPL operations. When an event is generated, an event message is automatically inserted into an event dispatcher queue. A program interested in knowing whether a UDAPL operation completed is responsible for determining whether the corresponding event message was placed in the event dispatcher queue. The UDAPL API provides methods that a program can invoke in order to help make this determination.

One such method, "dat_evd_dequeue( )," causes the invoking process to poll the event dispatcher queue in an attempt to discover whether the queue contains a specified event message. While the process is polling the event dispatcher queue, other processes are precluded from using the CPU. If a process continuously invokes "dat_evd_dequeue( )" until a desired event message is found within the event dispatcher queue, then other concurrently executing processes will be forced to wait until the desired event message is found before the CPU can perform any more of those other processes' operations. This monopolization of the CPU may be unacceptable in many multiprocessing and/or multi-user scenarios.

Another method provided by UDAPL, "dat_evd_wait( )," causes the invoking process to "block" until specified criteria, passed as a parameter to the method, are satisfied. When a process begins blocking, the operating system may store that process' in-memory data to a hard disk drive. While the process is blocking, the CPU may perform other process' operations; thus, the blocked process does not monopolize the CPU. When the specified criteria are satisfied and the process ceases blocking, the operating system may load the process' data into volatile memory from the hard disk drive so that the CPU can continue operating on that data. This loading is part of what is called a "context switch." Although the "dat_evd_wait( )" method avoids CPU monopolization, the context switch that is sometimes performed when blocking ceases often requires a substantial amount of time to perform. As a result, the performance of the process that was blocking can suffer. Some "real-time" applications cannot tolerate significant quantities of such performance penalties.

Thus, the use of either of these UDAPL event-handling methods has an associated drawback. Previous approaches for determining whether a UDAPL event was completed tended to suffer either from CPU monopolization or performance penalties related to context switching.

SUMMARY

A technique in accordance with one embodiment of the invention employs an adaptive algorithm that avoids CPU monopolization while also reducing the latency that results from extensive blocking. Typically, for each UDAPL operation that a process has initiated, the process expects to receive a separate corresponding event message as an acknowledgement that the UDAPL operation actually has completed. According to one embodiment of the invention, a process continuously and repetitively performs the following steps as long as the process expects to receive at least one event message.

By polling the event message queue at least once, the process determines whether the event message queue is empty. In response to determining that the event message queue is empty, the process blocks until specified criteria (some of which are described below) have been satisfied. While the process is blocking, the CPU can perform other processes' operations. Alternatively, in response to determining that the event message queue is not empty, the process reads at least one event message from the event message queue. After the process has either read at least one event message from the event message queue or finished blocking as described above, the foregoing steps are repeated if the process still expects to receive at least one more event message.

According to one embodiment of the invention, when the process blocks, the process blocks until (and only until) at least a specified number of event messages (e.g., the total remaining number of event messages that the process still expects to receive) have arrived in the event message queue. According to one embodiment of the invention, after a process has finished blocking, the process does not block again as long as at least one event message remains in the event message queue. Instead, the process reads event messages from the event message queue until the event message queue is empty.

As a result of the foregoing embodiment of the invention, processes do not monopolize the CPU by incessantly polling the event message queue until all expected messages have been received. Additionally, processes do not block longer than necessary or a greater number of times than is necessary. By reducing the number of times that processes block, fewer context switches are performed. Because fewer context switches are performed, fewer performance penalties are incurred.

DETAILED DESCRIPTION OF EMBODIMENT(S)

Overview

According to a technique described herein, a process enters a loop of execution from which the process does not exit until the process no longer expects to receive any more event messages (this condition occurs when the process has received a number of event messages equal to the number of corresponding operations that the process has initiated). While in the loop, the process first determines whether the event message queue currently contains any messages. If the process determines that the event message queue contains at least one event message, then the process reads an event message from the event message queue—thereby removing the event message from the event message queue—and the loop repeats without causing the process to block. Thus, as long as at least one event message remains in the message queue, the process continuously reads and removes event messages from the event message queue until no more event messages remain in the message queue.

Alternatively, if the process determines that the event message queue is empty, then the process blocks until the event message queue contains at least the number of event messages that the process still expects to receive. While the process is blocking, the CPU can perform other processes' operations, thereby avoiding CPU monopolization. When the event message queue contains at least the number of event messages that the process still expects to receive, the process ceases blocking and the loop repeats. This time, when the loop repeats, the process will be able to read all of the expected event messages from the event message queue, as described above, without blocking again. Because the process will typically not need to block more than once, there are fewer opportunities for the operating system to perform a context switch that involves the process. Fewer context switches performed relative to the process equates to reduced latency and higher process performance.

Example Flow

Figure 1:
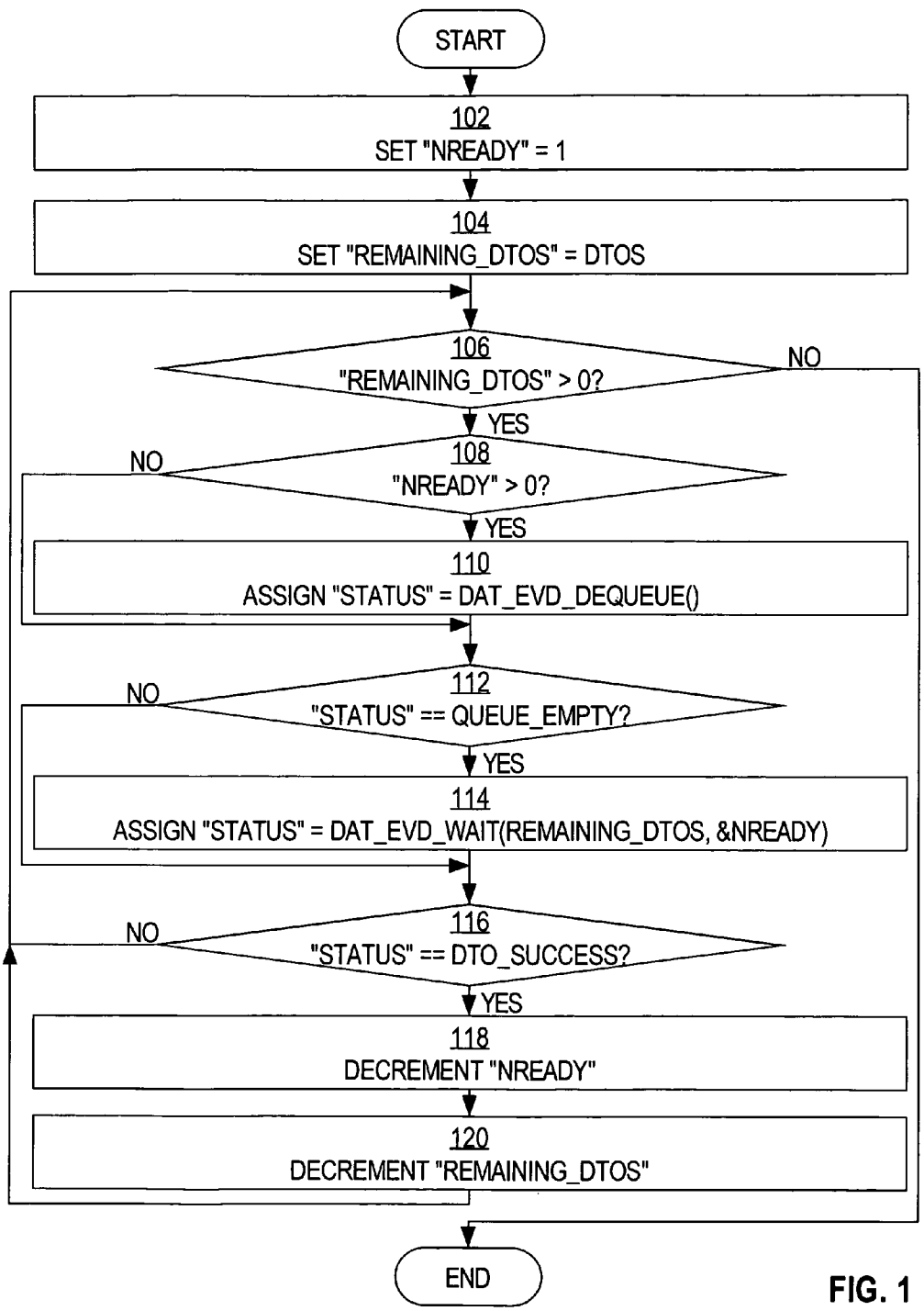
FIG. 1 is a flow diagram that illustrates an example of an adaptive technique for detecting the completion of UDAPL operations, according to an embodiment of the invention.

FIG. 1 is a flow diagram that illustrates an example of an adaptive technique for detecting the completion of UDAPL operations, according to an embodiment of the invention. Such a technique may be performed automatically by an executing computer program (i.e., a process), for example.

In block 102, a variable "nready" is set to 1. At any given time, the value of the variable "nready" indicates a quantity of event messages that are assumed to be, or actually are, currently in the event message queue. Initially, an assumption is made that at least one event message is contained in the event message queue.

In block 104, a variable "remaining_dtos" is set equal to the number of data transfer operations ("DTOs") that the process has initiated. According to one embodiment of the invention, the DTOs are UDAPL operations that the process has initiated by invoking certain methods of the UDAPL API (e.g., "dat_cr_accept( )," "dat_ep_create( )," "dat_ep_connect( )," "dat_ep_disconnect( )," "dat_lmr_create( )," "dat_lmr_free( )," "dat_rmr_create( )," "dat_rmr_free( )," "dat_rmr_bind( )," "dat_evd_post_send( )," "dat_evd_post_recv( )," "dat_evd_post_rdma_write( )," "dat_evd_post_rdma_read( )," etc.). At any given time, the value of the variable "remaining_dtos" indicates a quantity of operations that the process has initiated but for which the process has not yet received acknowledgements of completion in the form of event messages corresponding to the operations.

In block 106, a determination is made as to whether the value of "remaining_dtos" is greater than zero. If the value of "remaining_dtos" is greater than zero, then control passes to block 108. Otherwise, the adaptive technique described herein is completed (the process does not expect to receive any more event messages), and the process resumes performing other specified operations.

In block 108, a determination is made as to whether the value of "nready" is greater than zero. If the value of "nready" is greater than zero, then control passes to block 110. Otherwise, control passes to block 112.

In block 110, a variable "status" is assigned the value that is returned by the invocation of the UDAPL "dat_evd_dequeue( )" method. The "dat_evd_dequeue( )" method determines whether the event message queue contains at least one event message. If the event message queue contains at least one event message, then the "dat_evd_dequeue( )" method reads an event message from the message queue, thereby removing that event message from the message queue. If the "dat_evd_dequeue( )" method successfully read an event message from the message queue, then the "dat_evd_dequeue( )" method returns a value "DTO_SUCCESS" (which may be defined as any unique specified value). Alternatively, if the "dat_evd_dequeue( )" method was unable to read an event message from the message queue because the message queue was empty, then the "dat_evd_dequeue( )" method returns a value "QUEUE_EMPTY" (which may be defined as any unique specified value).

In block 112, a determination is made as to whether value of "status" is equal to "QUEUE_EMPTY." If the value of "status" is equal to "QUEUE_EMPTY," then control passes to block 114. Otherwise, control passes to block 116.

In block 114, the variable "status" is assigned the value that is returned by the invocation of the UDAPL "dat_evd_wait( )" method. Two parameters are passed to the "dat_evd_wait( )" method in the invocation of the "dat_evd_wait( )" method. One parameter is the value of "remaining_dtos." The other parameter is a pointer to "nready." The invocation of the "dat_evd_wait( )" method causes the process invoking the "dat_evd_wait( )" method (the "invoking process") to begin blocking.

While the invoking process is blocking, the operating system may perform a context switch, thereby storing the invoking process' in-memory data to a hard disk drive so that the memory can be used to store other processes' data temporarily. While the process invoking the "dat_evd_wait( )" method is blocking, the CPU can perform operations on other processes' data. Thus, by blocking, the invoking process refrains from monopolizing the CPU, which would have resulted if the invoking process instead had invoked the "dat_evd_dequeue( )" method over and over, without interruption, until all of the expected event messages had been received and read.

According to one embodiment of the invention, when the number of event messages in the event message queue becomes at least as great as the value of "remaining_dtos" (which was passed as a parameter to the "dat_evd_wait( )" method), the dat_evd_wait( )" method performs several actions. First, the "dat_evd_wait( )" method assigns, to the "nready" variable referred to by the pointer previously passed to "dat_evd_wait( )" as a parameter, a value that indicates the number of event messages currently in the event message queue. Next, the "dat_evd_wait( )" method causes the invoking process to cease blocking. If a context switch was performed earlier, the operating system loads the invoking process' data from the hard disk drive back into volatile memory so that the CPU can resume performing operations relative to the invoking process' data. After performing the actions discussed above, the "dat_evd_wait( )" method returns. Control passes to block 116.

Usually, a process will not need to block more than once while performing the techniques described herein. Consequently, the number of potential context switches that the operating system might perform is reduced. As a result, processes employing the techniques described herein suffer fewer performance penalties.

In block 116, a determination is made as to whether value of "status" is equal to "DTO_SUCCESS." If the value of "status" is equal to "DTO_SUCCESS," then control passes to block 118. Otherwise, control passes back to block 106, in which the technique loops if the process expects to receive any additional event messages.

In block 118, the value of "nready" is decremented by one. This is because the number of messages currently contained in the event message queue was reduced by one when the method "dat_evd_dequeue( )" successfully read an event message in block 110 (as evidenced by the method's return of "DTO_SUCCESS" value rather than "QUEUE_EMPTY"). Control passes to block 120.

In block 120, the value of "remaining_dtos" is decremented by one. This is because the number of messages that the process still expects to receive was reduced by one when the method "dat_evd_dequeue( )" successfully read an event message in block 110 (as evidenced by the method's return of "DTO_SUCCESS" value rather than "QUEUE_EMPTY"). Control passes back to block 106, in which the technique loops if the process expects to receive any additional event messages.

Another way of expressing the technique described above is through the pseudo code below:

```
nready = 1;
remaining_dtos = DTOs;
while (remaining_dtos) {
if (nready > 0) status = dat_evd_dequeue( );
if (status == QUEUE_EMPTY)
    status = dat_evd_wait(remaining_dtos, &nready);
if (status == DTO_SUCCESS) {
  --nready;
  --remaining_dtos;
}
}
```

Thus, the above technique allows a process to receive UDAPL events without monopolizing the CPU and without incurring undue quantities of performance penalties related to context switching.

Optional Alternatives

In an embodiment of the invention described above, the "dat_evd_dequeue( )" method is invoked only once per each iteration of block 110. Thus, under circumstances in which the event message queue is empty, the process will only poll the event message queue once before blocking. This helps to prevent the process from monopolizing the CPU.

However, in an alternative embodiment of the invention, the "dat_evd_dequeue( )" method is invoked multiple times (i.e., two or more) to determine whether an event message has arrived in the event message queue before the process blocks. In such an alternative embodiment of the invention, the process may attempt to dequeue an event message from the message queue a specified number of times before the process yields the CPU to other processes by blocking. Although such multiple attempts may allow the process to preclude other processes from using the CPU for a longer time interval, this alternative embodiment of the invention may help to reduce the latency experienced by a time-critical process even further.

Hardware Overview

Figure 2:
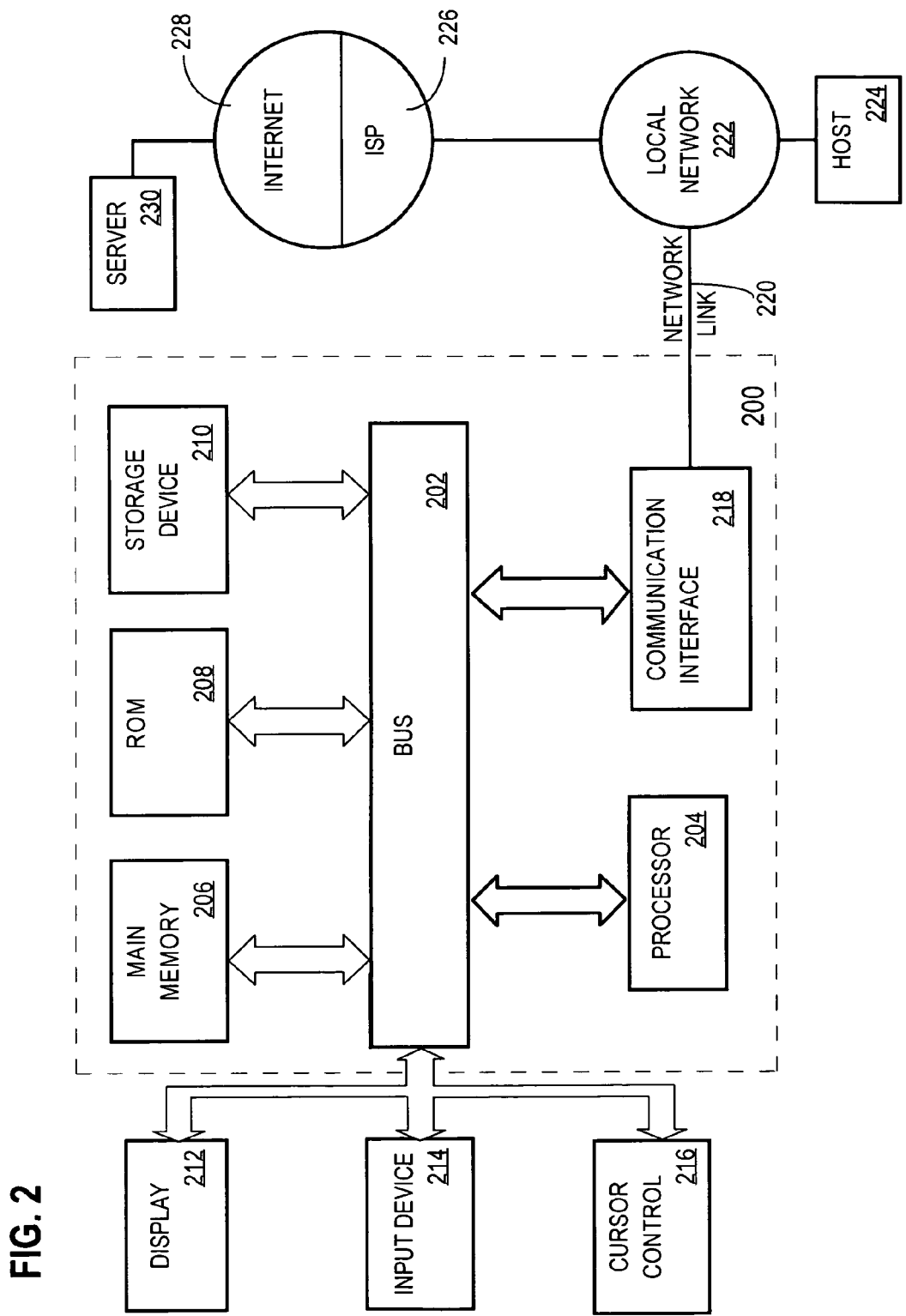
FIG. 2 is a hardware block diagram of an example computer entity, upon which certain embodiments of the invention may be implemented.

FIG. 2 is a block diagram that illustrates a computer system 200 upon which an embodiment of the invention may be implemented. Computer system 200 includes a bus 202 for facilitating information exchange, and one or more processors 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions by processor 204. Computer system 200 may further include a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

In computer system 200, bus 202 may be any mechanism and/or medium that enables information, signals, data, etc., to be exchanged between the various components. For example, bus 202 may be a set of conductors that carries electrical signals. Bus 202 may also be a wireless medium that carries wireless signals between one or more of the components. Bus 202 may also be a medium that enables signals to be capacitively exchanged between one or more of the components. Bus 202 may further be a network connection that connects one or more of the components. Overall, any mechanism and/or medium that enables information, signals, data, etc., to be exchanged between the various components may be used as bus 202.

Bus 202 may also be a combination of these mechanisms/media. For example, processor 204 may communicate with storage device 210 wirelessly. In such a case, the bus 202, from the standpoint of processor 204 and storage device 210, would be a wireless medium, such as an electromagnetic wave. Further, processor 204 may communicate with ROM 208 capacitively. In this instance, the bus 202 would be the medium that enables this capacitive communication to take place. Further, processor 204 may communicate with main memory 206 via a network connection. In this case, the bus 202 would be the network connection. Further, processor 204 may communicate with display 212 via a set of conductors. In this instance, the bus 202 would be the set of conductors. Thus, depending upon how the various components communicate with each other, bus 202 may take on different forms. Bus 202, as shown in FIG. 2, functionally represents all of the mechanisms and/or media that enable information, signals, data, etc., to be exchanged between the various components.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the worldwide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

Processor 204 may execute the received code as the code is received and/or stored in storage device 210 or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for obtaining event messages, the method comprising:
 (a) if receipt of at least one event message is expected, then determining whether an event message queue is empty;

(b) in response to a determination that the event message queue is not empty, a processor performing steps comprising:
  reading at least one event message from the event message queue; and
  repeating at least step (a); and
(c) in response to a determination that the event message queue is empty, the processor performing steps comprising:
  blocking until specified criteria have been satisfied; and
  after the specified criteria have been satisfied, repeating at least step (a);
wherein at least one condition from a set of conditions is true, wherein the set of conditions consists of:
  (1) wherein the step of blocking until the specified criteria have been satisfied comprises invoking a User Direct Access Programming Library (UDAPL) dat_evd_wait method and passing, as parameters to the UDAPL dat_evd_wait method, both (i) a value that indicates a quantity of event messages that a process still expects to receive, and (ii) a pointer to a variable into which the UDAPL dat_evd_wait method will insert a quantity of event messages that are in the event message queue when the UDAPL dat_evd_wait method returns;
  (2) wherein the step of reading at least one event message from the event message queue comprises invoking a User Direct Access Programming Library (UDAPL) dat_evd_dequeue method; and
  (3) wherein the step of determining whether the event message queue is empty comprises invoking a User Direct Access Programming Library (UDAPL) dat_evd_dequeue method at least a specified number of times before blocking, and wherein the specified number of times is at least two.

2. The method of claim 1, wherein the step of blocking until the specified criteria have been satisfied comprises blocking until the event message queue contains a specified quantity of event messages.

3. The method of claim 2, wherein the specified quantity of event messages is a quantity of event messages that a process still expects to receive.

4. The method of claim 3, wherein the specified quantity of event messages that the process still expects to receive is based on both (i) a quantity of User Direct Access Programming Library (UDAPL) operations that the process has initiated and (ii) a quantity of event messages that the process already has received.

5. The method of claim 1, wherein the step of determining whether the event message queue is empty comprises polling the event message queue.

6. The method of claim 1, wherein the step of determining whether the event message queue is empty comprises invoking a User Direct Access Programming Library (UDAPL) dat_evd_dequeue method.

7. The method of claim 1, wherein the step of blocking until the specified criteria have been satisfied comprises invoking a User Direct Access Programming Library (UDAPL) dat_evd_wait method.

8. A volatile or non-volatile machine-readable storage medium carrying one or more sequences of instructions, which instructions, when executed by one or more processors, cause the one or more processors to carry out steps comprising:
  (a) if receipt of at least one event message is expected, then determining whether an event message queue is empty;
  (b) in response to a determination that the event message queue is not empty, performing steps comprising:
    reading at least one event message from the event message queue; and
    repeating at least step (a); and
  (c) in response to a determination that the event message queue is empty, performing steps comprising:
    blocking until specified criteria have been satisfied; and
    after the specified criteria have been satisfied, repeating at least step (a);
  wherein at least one condition from a set of conditions is true, wherein the set of conditions consists of:
    (1) wherein the step of blocking until the specified criteria have been satisfied comprises invoking a User Direct Access Programming Library (UDAPL) dat_evd_wait method and passing, as parameters to the UDAPL dat_evd_wait method, both (i) a value that indicates a quantity of event messages that a process still expects to receive, and (ii) a pointer to a variable into which the UDAPL dat_evd_wait method will insert a quantity of event messages that are in the event message queue when the UDAPL dat_evd_wait method returns;
    (2) wherein the step of reading at least one event message from the event message queue comprises invoking a User Direct Access Programming Library (UDAPL) dat_evd_dequeue method; and
    (3) wherein the step of determining whether the event message queue is empty comprises invoking a User Direct Access Programming Library (UDAPL) dat_evd_dequeue method at least a specified number of times before blocking, and wherein the specified number of times is at least two.

9. The volatile or non-volatile machine-readable storage medium of claim 8, wherein the step of blocking until the specified criteria have been satisfied comprises blocking until the event message queue contains a specified quantity of event messages.

10. The volatile or non-volatile machine-readable storage medium of claim 9, wherein the specified quantity of event messages is a quantity of event messages that a process still expects to receive.

11. The volatile or non-volatile machine-readable storage medium of claim 10, wherein the specified quantity of event messages that the process still expects to receive is based on both (i) a quantity of User Direct Access Programming Library (UDAPL) operations that the process has initiated and (ii) a quantity of event messages that the process already has received.

12. The volatile or non-volatile machine-readable storage medium of claim 8, wherein the step of determining whether the event message queue is empty comprises polling the event message queue.

13. The volatile or non-volatile machine-readable storage medium of claim 8, wherein the step of determining whether the event message queue is empty comprises invoking a User Direct Access Programming Library (UDAPL) dat_evd_dequeue method.

14. The volatile or non-volatile machine-readable storage medium of claim 8, wherein the step of blocking until the specified criteria have been satisfied comprises invoking a User Direct Access Programming Library (UDAPL) dat_evd_wait method.

15. An apparatus comprising:
  a mechanism for determining whether an event message queue is empty if receipt of at least one event message is expected;

a mechanism for reading, in response to a determination that the event message queue is not empty, at least one event message from the event message queue;

a mechanism for re-invoking at least the mechanism for determining after an invocation of the mechanism for reading;

a mechanism for blocking, in response to a determination that the event message queue is empty, until specified criteria have been satisfied; and a mechanism for re-invoking at least the mechanism for determining after an invocation of the mechanism for blocking;

wherein at least one condition from a set of conditions is true, wherein the set of conditions consists of:

(1) wherein the mechanism for blocking until the specified criteria have been satisfied comprises a mechanism for invoking a User Direct Access Programming Library (UDAPL) dat_evd_wait method and passing, as parameters to the UDAPL dat_evd_wait method, both (i) a value that indicates a quantity of event messages that a process still expects to receive, and (ii) a pointer to a variable into which the UDAPL dat_evd_wait method will insert a quantity of event messages that are in the event message queue when the UDAPL dat_evd_wait method returns;

(2) wherein the mechanism for reading at least one event message from the event message queue comprises a mechanism for invoking a User Direct Access Programming Library (UDAPL) dat_evd_dequeue method; and (3) wherein the mechanism for determining whether the event message queue is empty comprises a mechanism for invoking a User Direct Access Programming Library (UDAPL) dat_evd_dequeue method at least a specified number of times before blocking, and wherein the specified number of times is at least two.

16. The apparatus of claim 15, wherein the mechanism for blocking until the specified criteria have been satisfied comprises a mechanism for blocking until the event message queue contains a specified quantity of event messages.

17. The apparatus of claim 16, wherein the specified quantity of event messages is a quantity of event messages that a process still expects to receive.

18. The apparatus of claim 17, wherein the specified quantity of event messages that the process still expects to receive is based on both (i) a quantity of User Direct Access Programming Library (UDAPL) operations that the process has initiated and (ii) a quantity of event messages that the process already has received.

19. The apparatus of claim 15, wherein the mechanism for determining whether the event message queue is empty comprises a mechanism for polling the event message queue.

20. The apparatus of claim 15, wherein the mechanism for determining whether the event message queue is empty comprises a mechanism for invoking a User Direct Access Programming Library (UDAPL) dat_evd_dequeue method.

21. The apparatus of claim 15, wherein the mechanism for blocking until the specified criteria have been satisfied comprises a mechanism for invoking a User Direct Access Programming Library (UDAPL) dat_evd_wait method.

* * * * *

UNITED STATES PATENT AND TRADEMARK OFFICE
CERTIFICATE OF CORRECTION

PATENT NO. : 7,577,712 B1  Page 1 of 1
APPLICATION NO. : 11/395745
DATED : August 18, 2009
INVENTOR(S) : Ramannavar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 671 days.

Signed and Sealed this

Seventh Day of September, 2010

David J. Kappos
*Director of the United States Patent and Trademark Office*